(12) United States Patent  
Tobisaka et al.

(10) Patent No.: US 7,595,866 B2
(45) Date of Patent: Sep. 29, 2009

(54) METHOD FOR MEASURING NON-CIRCULARITY AT CORE PORTION OF OPTICAL FIBER PARENT MATERIAL

(75) Inventors: Yuuji Tobisaka, Gunma (JP); Tetsuya Otosaka, Gunma (JP); Hiroshi Oyamada, Gunma (JP)

(73) Assignee: Shin Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/892,276

(22) Filed: Aug. 21, 2007

(65) Prior Publication Data

US 2008/0068594 A1   Mar. 20, 2008

Related U.S. Application Data

(63) Continuation of application No. PCT/JP2005/023410, filed on Dec. 20, 2005.

(30) Foreign Application Priority Data

Feb. 22, 2005   (JP) ............................. 2005-045329

(51) Int. Cl.
*G01N 21/00* (2006.01)
(52) U.S. Cl. ..................................... 356/73.1
(58) Field of Classification Search ................. 356/73.1
See application file for complete search history.

(56) References Cited

U.S. PATENT DOCUMENTS 4,227,806 A * 10/1980 Watkins ..................... 356/73.1

(Continued)

FOREIGN PATENT DOCUMENTS

JP   55-10540   1/1980

(Continued)

OTHER PUBLICATIONS

European Search Report dated Mar. 19, 2008.

(Continued)

*Primary Examiner*—Tarifur Chowdhury
*Assistant Examiner*—Tara S Pajoohi
(74) *Attorney, Agent, or Firm*—McGinn IP Law Group, PLLC

(57) ABSTRACT

A method for measuring non-circularity of a core portion of an optical fiber base material includes a distribution measuring step of (i) moving the optical fiber base material in a direction parallel to a central axis of the core portion while light is irradiated, in a direction perpendicular to the central axis, to the optical fiber base material which is immersed in the matching oil, and (ii) recording a variation in a width of a portion of the irradiated light which transmits through the core portion in association with a moved distance of the optical fiber base material, thereby measuring a distribution of relative values of an outer diameter of the core portion in terms of a longitudinal direction of the optical fiber base material, a distribution storing step of performing the distribution measuring step each time the optical fiber base material is rotated about the central axis by a predetermined angle, thereby recording a plurality of distributions of the relative values of the outer diameter of the core portion each of which is associated with the predetermined angle, and a non-circularity calculating step of calculating a plurality of values, in terms of the longitudinal direction of the optical fiber base material, each indicating non-circularity of the core portion, based on the plurality of distributions of the relative values of the outer diameter stored in the distribution storing step.

10 Claims, 9 Drawing Sheets

U.S. PATENT DOCUMENTS 5,162,864 A * 11/1992 Haigh ....................... 356/73.1
5,408,309 A *  4/1995 Shimada et al. ............ 356/73.1
2004/0017557 A1* 1/2004 Huang et al. ............... 356/73.1

FOREIGN PATENT DOCUMENTS

| | | |
|---|---|---|
| JP | 63-195505 | 8/1988 |
| JP | 03-057935 * | 3/1991 |
| JP | 8-297071 | 11/1996 |
| JP | 3014777 | 12/1999 |
| JP | 2000-146759 | 5/2000 |
| JP | 2001-4486 | 1/2001 |
| JP | 2001-99616 | 4/2001 |
| JP | 2003-42894 | 2/2003 |
| JP | 2003-57020 | 2/2003 |
| JP | 2004-233364 | 8/2004 |

OTHER PUBLICATIONS

English-Language Translation of a Chinese Office Action dated Mar. 27, 2009.

English-Language Translation of Japanese Patent Publication No. 2003-57020.

* cited by examiner

METHOD FOR MEASURING NON-CIRCULARITY AT CORE PORTION OF OPTICAL FIBER PARENT MATERIAL

CROSS-REFERENCE TO RELATED APPLICATION

This is a continuation application of PCT/JP2005/23410 filed on Dec. 20, 2005 which claims priority from a Japanese Patent Application No. 2005-045329 filed on Feb. 22, 2005, the contents of which are incorporated herein by reference.

BACKGROUND

1. Technical Field

The present invention relates to a method for measuring core portion noncircularity of an optical fiber base material. More particularly, the present invention relates to a method for measuring core portion noncircularity of an optical fiber base material which is used as a raw material for manufacturing an optical fiber.

2. Related Art

In recent years, polarization mode dispersion (hereinafter referred to as PMD) is listed as one of the factors that make it difficult to realize optical communication for a longer distance and at a higher speed. Here, PMD is a phenomenon where two modes that induce polarizations perpendicular to each other are propagated at slightly different speeds within an optical fiber and the width of an input pulse therefore increases as the pulse is propagated in the optical fiber.

When optical communication is significantly affected by the PMD, different pulses of signal light partly overlap each other. In this case, a receiving section can not distinguish the pulses. When higher-speed communication is performed by reducing the pulse width, the PMD may prevent the communication from being performed with a target pulse width. Furthermore, the long-distance communication is exposed to a higher risk, due to the PMD, that the pulses of the signal overlap each other to cause a communication error.

A typical single-mode optical fiber includes a core portion and a clad portion, where the core portion has a higher refractive index than a portion surrounding the core portion and the clad portion covers the core portion. Here, it is mainly the core portion where light is propagated. When the core portion is perfectly circular, the two modes that induce polarizations perpendicular to each other are degenerated and can not be distinguished. When the core portion is not perfectly circular or the core portion loses symmetry because the core portion is deformed during the manufacturing process of the optical fiber or optical fiber cable, the two modes are propagated at different speeds from each other within the optical fiber, thereby causing the PMD.

One of the methods to control the PMD is to measure and control the non-circularity of the core portion of the optical fiber base material. Here, Unexamined Japanese Patent Application Publication No. 2003-042894 discloses the following method for measuring the non-circularity of the core portion. The optical fiber base material is immersed in a liquid filled with a matching oil. While the optical fiber base material is rotated, parallel light is irradiated to the lateral surface of the optical fiber base material. Part of the irradiated light transmits through the optical fiber base material, and is received and imaged. Based on the brightness distribution of the image, the outer diameter of the core portion is measured. The values of the outer diameter of the core portion which are sequentially measured along the perimeter are used to calculate the noncircularity of the core portion.

To control the PMD by controlling the non-circularity of the core portion of the optical fiber base material, it is necessary to predict the PMD which may be caused in an optical fiber that is manufactured from the optical fiber base material. This prediction requires measurement of the non-circularity of the core portion to be performed at fairly small intervals. When the non-circularity of the core portion of the optical fiber is desired to be known at an interval of 1 km, the non-circularity of the core portion of the optical fiber base material with an outer diameter of 80 mm needs to be measured at an interval of approximately 2.4 mm, and the non-circularity of a core base material with a core outer diameter of 18 mm needs to be measured at an interval of approximately 0.2 mm.

The above-described unexamined Japanese Patent Application Publication discloses the method for measuring the outer diameter of the core portion of the optical fiber base material while the optical fiber base material is being rotated. After the optical fiber base material is completely rotated once for the measurement of the outer diameter of the core portion, the base material needs to be moved and held so that the measurement is performed at the next measurement position. Thus, a certain time is required for such movement of the optical fiber base material. Even though the measuring process is automated and the movement of the optical fiber base material from one measurement position to the next measurement position is completed in one second, the movement between the measurement positions alone takes no less than 16 minutes to perform the measuring process on an optical fiber base material having a length of 1000 mm at an interval of 1 mm. When the measuring process is performed at an interval of 0.2 mm on a core base material having a length of 500 mm, the movement between the measurement positions takes no less than 40 minutes. Here, the total time required to measure the outer diameter of the core portion further includes the time for the rotation and the time for the calculation in addition to the time for the movement. As a result, an extremely long time is consumed for the measuring process of the outer diameter of the core portion.

To address this problem, the optical fiber base material may be rotated and moved at a higher speed. This, however, may cause leakage of the matching oil from the inserting section through which the optical fiber base material is inserted even though the vessel for the measuring section which is filled with the matching oil is sealed with the use of an elastic packing material.

SUMMARY

To solve the above-mentioned problems, an objective of the present invention is to provide a method for measuring non-circularity of a core portion of an optical fiber base material which enables measurement of non-circularity of a core portion of an optical fiber base material to be completed within a short time.

A first embodiment of the present invention provides a method for measuring non-circularity of a core portion of an optical fiber base material. The method includes a distribution measuring step of (i) moving the optical fiber base material in a direction parallel to a central axis of the core portion while light is irradiated, in a direction perpendicular to the central axis, to the optical fiber base material which is immersed in an oil, and (ii) recording a variation in a width of a portion of the irradiated light which transmits through the core portion in association with a moved distance of the optical fiber base material, thereby measuring a distribution of relative values of an outer diameter of the core portion in terms of a longitudinal direction of the optical fiber base material, a distribution storing step of performing the distribution measuring step each time the optical fiber base material is rotated about the central axis by a predetermined angle, thereby recording a plurality of distributions of the relative values of the outer diameter of the core portion each of which is associated with the predetermined angle, and a non-circularity calculating step of calculating a plurality of values, in terms of the longitudinal direction of the optical fiber base material, each indicating non-circularity of the core portion, based on the plurality of distributions of the relative values of the outer diameter stored in the distribution storing step. According to the above-described method, the measurement is not performed in such a manner that the optical fiber base material is held and rotated for each measurement position determined in the longitudinal direction of the optical fiber base material. Alternatively, the relative values of the outer diameter of the core portion are serially measured in the longitudinal direction while the optical fiber base material held at each angle is moved upward or downward. In other words, it is not necessary to align the optical fiber base material, which is held at each angle, in terms of the measurement positions in the longitudinal direction when the relative values of the outer diameter of the core portion are measured. This feature can remove the limitation that is put on the moving speed due to the requirements relating to the alignment accuracy. As a result, the optical fiber base material can be moved at a high speed, and the measurement can be completed within a short time.

Referring to the above-described method, the predetermined angle is equal to a result of dividing an angle corresponding to one rotation of the optical fiber base material about the central axis by a number selected from 7 to 20. To be specific, when the dividing number is less than seven, the accuracy of the calculated non-circularity is remarkably degraded. On the other hand, even though the dividing number is increased from 20, the accuracy of the calculated non-circularity stays at substantially the same level. Therefore, the dividing number preferably falls within a range from 7 to 20 to calculate accurate non-circularity within a short time period.

Referring to the above-described method, the plurality of values each indicating the non-circularity of the core portion may be preferably calculated after approximated values are calculated for each of the plurality of distributions by means of a polynomial approximation and a measured value is eliminated as an abnormal value when the measured value is remarkably deviated from an acceptable range that is determined in advance with respect to the approximated values. This feature prevents an accidental abnormal measured value from affecting the calculation of the non-circularity.

The approximated values may be preferably calculated by means of one of sixth-order to tenth-order polynomial approximations. This feature makes it possible to calculate accurate approximated values within a short time.

Referring to the above-described method, each of the plurality of distributions of the relative values of the outer diameter of the core portion may be generated by interpolating, based on each pair of adjacent relative values of the outer diameter of the core portion, a plurality of relative values of the outer diameter of the core portion which are measured at a predetermined interval in the direction parallel to the central axis. This feature can further improve the effective measurement accuracy.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

Figure 1:
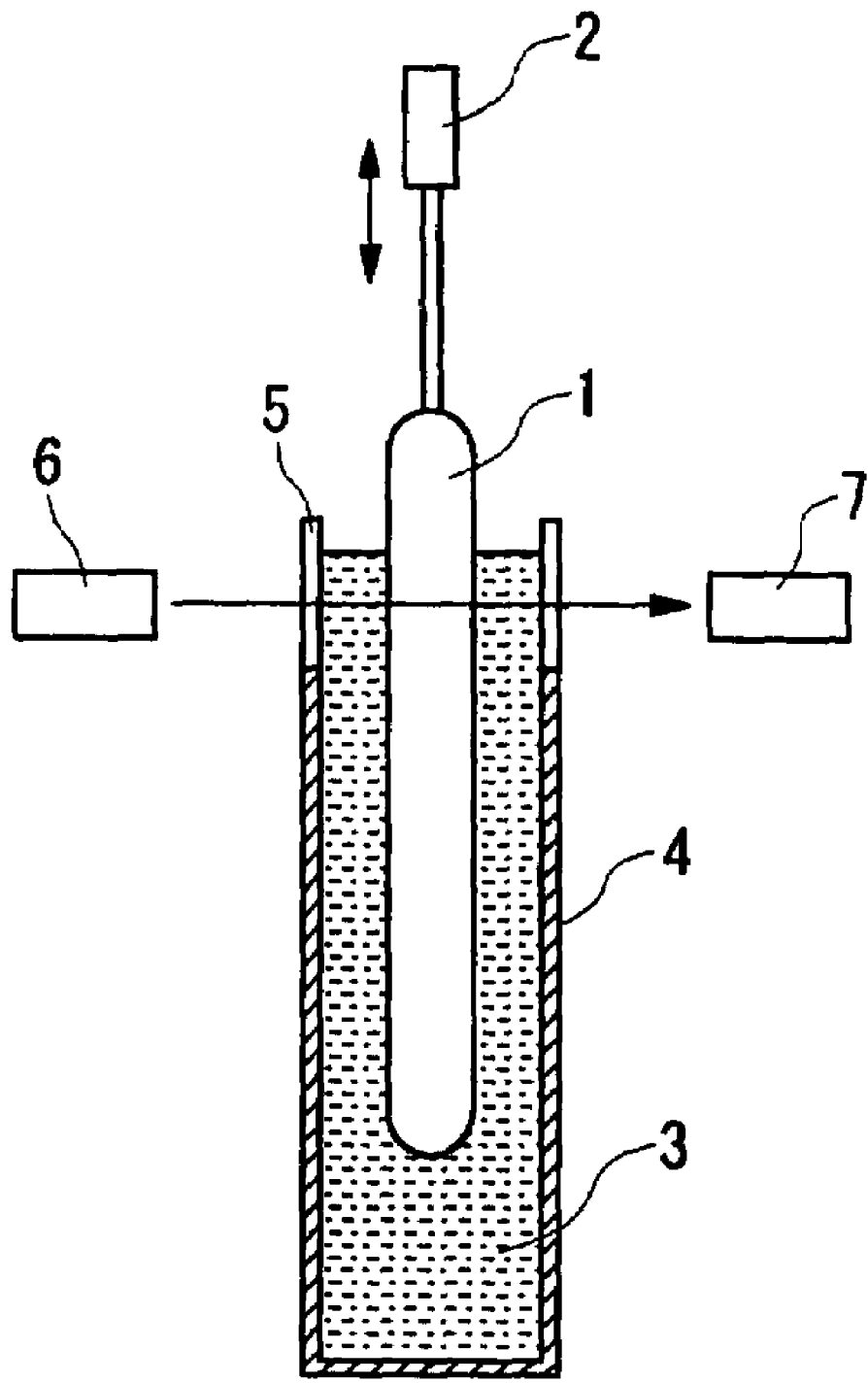
FIG. 1 is a schematic view illustrating the configuration of a non-circularity measuring device which measures the non-circularity of an optical fiber base material.

FIG. 1 is a schematic view illustrating the configuration of a non-circularity measuring device which measures the non-circularity of an optical fiber base material 1. The optical fiber base material 1 is vertically held by a hanger device 2 that can be moved upward and downward and rotated in such a manner as to be immersed in a vessel 4 filled with a matching oil 3. In the upper portion of the vessel 4, a measuring window 5 is provided to enable parallel light to enter the optical fiber base material 1 from a lateral surface thereof and to monitor part of the light which transmits through the optical fiber base material 1. The measurement of the relative value of the outer diameter (described later) is performed on a portion of the optical fiber base material 1 which is immersed in the matching oil 3.

A light source 6 irradiates laser light to the portion of the optical fiber base material 1 which is immersed in the matching oil 3, and a light receiving section 7 receives light which transmits through the optical fiber base material 1. The brightness distribution of the image generated by the light receiving section 7 is then used to obtain the relative value of the outer diameter of the core portion with respect to the outer diameter of the optical fiber base material 1. While the optical fiber base material 1 is moved upward or downward, the relative value of the outer diameter is measured at a plurality of times in terms of the longitudinal direction of the optical fiber base material 1. Here, the positions for which the measurement is performed and the values obtained by the measurement are recorded. This measurement process produces a distribution of the relative values of the outer diameter of the core portion in relation to the longitudinal direction of the optical fiber base material 1.

Following this, the optical fiber base material 1 is rotated by a predetermined angle around the central axis extending in the longitudinal direction of the optical fiber base material 1, and the above-described process is repeated to measure the distribution of the relative values of the outer diameter of the core portion. In this way, a plurality of distributions of the relative values of the outer diameter of the core portion are obtained, for the single optical fiber base material 1, in association with a plurality of different angles, and stored.

The stored plurality of distributions of the relative values of the outer diameter of the core portion are referred to extract relative values of the outer diameter of the core portion, for a given position determined in the longitudinal direction of the optical fiber base material 1, in association with respective angles. The extracted relative values of the outer diameter are used to calculate the non-circularity of the core portion at the given position. This non-circularity calculation process is performed for a plurality of different positions determined in the longitudinal direction of the optical fiber base material 1. In this way, the non-circularity can be obtained for the entire length of the optical fiber base material 1.

As described above, the optical fiber base material 1 is not rotated at each of the different positions arranged in the longitudinal direction in the measuring method according to the present invention. Alternatively, the relative values of the outer diameter are measured in a serial manner in the longitudinal direction of the optical fiber base material 1 for the effective length thereof, to obtain the distribution of the relative values of the outer diameter. This distribution obtaining process is repeated by rotating the optical fiber base material 1 by a predetermined angle. Therefore, it is not necessary to frequently and repeatedly rotate and hold the optical fiber base material 1 during the measurement process, differently from the conventional technique. As a result, the measurement process can be completed within a shorter time. In addition, the optical fiber base material 1 is moved for the measurement in a vertical direction within a vessel that is open at the upper end thereof according to the present invention. This removes the need for the sealing section of sealing together the optical fiber base material 1 and the vessel filled with the matching oil, and thus eliminates the risk of matching oil leakage. Therefore, the optical fiber base material 1 can be moved at a higher speed.

Referring to each cycle of measuring the distribution of the relative values of the outer diameter, it is preferable to measure the relative values of the outer diameter of the core portion at smaller intervals in the longitudinal direction of the optical fiber base material 1. Here, by performing a later described process on the measured distribution of the relative values of the outer diameter, as many relative values of the outer diameter of the core portion as desired may be obtained while the optical fiber base material 1 is moved upward or downward without being aligned in terms of the measurement positions determined in the longitudinal direction. The measured relative values of the outer diameter are recorded in a memory or different recording medium together with the measurement positions in the longitudinal direction, so that the distribution of the relative values of the outer diameter is stored.

Figure 2:
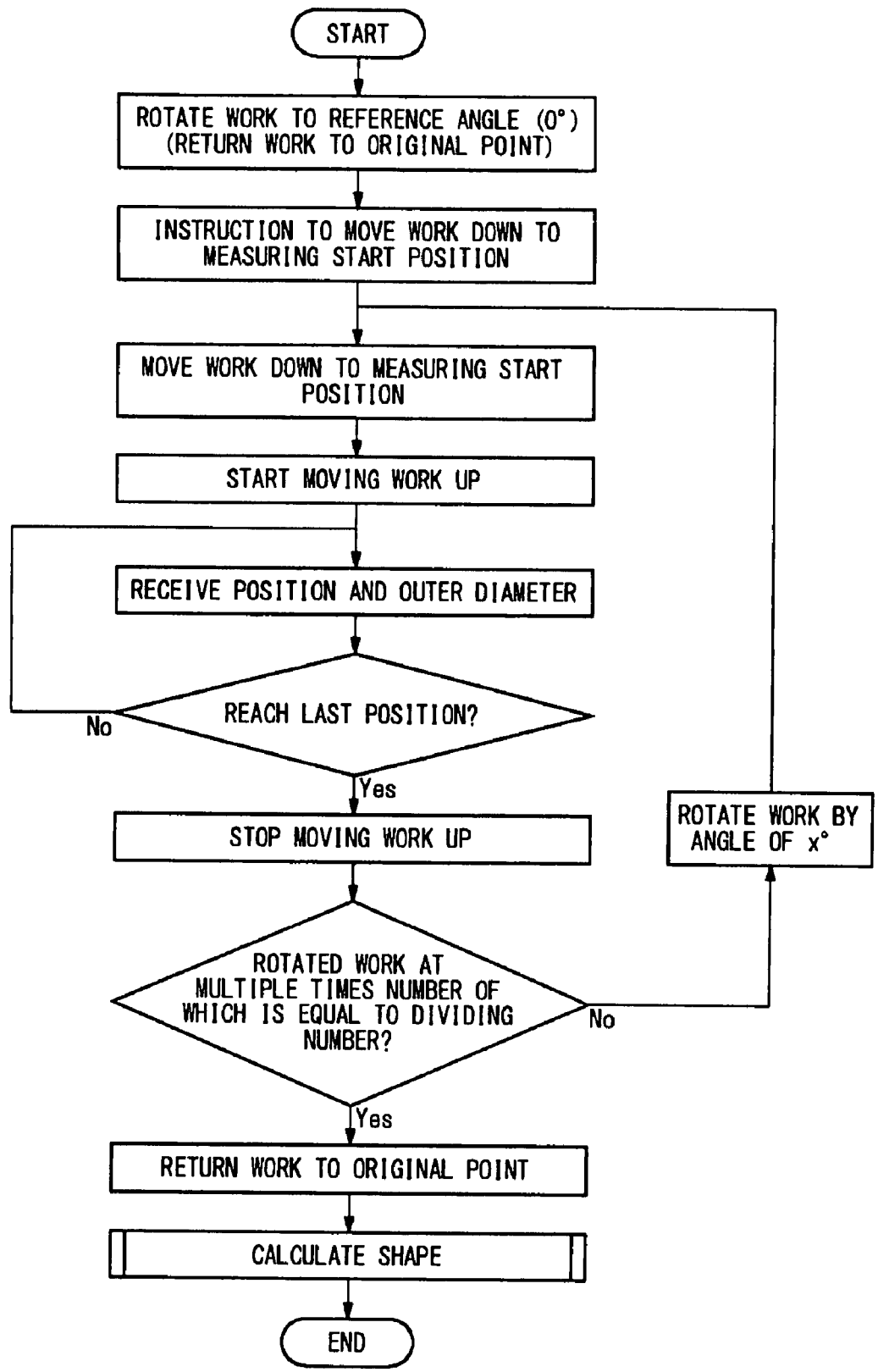
FIG. 2 is a flow chart illustrating a process of measuring a core diameter according to the present invention.

FIG. 2 is a flow chart illustrating the process to measure the distribution of the relative values of the outer diameter and the process of storing the distributions of the relative values of the outer diameter. As shown in the flow chart of FIG. 2, the optical fiber base material 1 is fixed in the measuring device. While the optical fiber base material 1 is moved upward or downwards, the outer diameter of the core portion of the optical fiber base material 1 is measured for a predetermined length of the optical fiber base material 1 in a serial manner in the longitudinal direction of the optical fiber base material 1. Here, the angular position of the optical fiber base material 1 for this initial cycle of the measurement is referred to as a reference angle (0°). After this, the measurement process of the distribution of the relative values of the outer diameter is repeated by rotating the optical fiber base material 1 by an angle determined in accordance with a dividing number associated with the direction along the perimeter in which the measurement is repeated (hereinafter referred to as a perimeter dividing number). The distribution measurement process is performed at a plurality of times the number of which is equal to the perimeter dividing number, to obtain a plurality of distributions of the relative values of the outer diameter the number of which corresponds to the perimeter dividing number.

Here, the number of times at which the distribution of the relative values of the outer diameter is measured, that is to say, the perimeter dividing number is preferably selected from the numbers from 7 to 20 to obtain a valid value for the non-circularity. The relative value of the outer diameter of the core portion is serially measured in the longitudinal direction of the optical fiber base material 1, in association with each of the angles arranged at an angular pitch which is equal to the number obtained by dividing the angle of 360° with the perimeter dividing number. When it is desired to obtain a rough value of the non-circularity within a short time, the perimeter dividing number is set at five for example. When an accurate value of the non-circularity is desired, the perimeter dividing number is set at 20 for example. When the perimeter dividing number is set at 16, Fast Fourier Transform (FF) is possible and the shape of the core portion can be also easily reviewed in detail. In a normal case, the perimeter dividing number is preferably set at around 10 from the aspects of accuracy and the time required for the measuring process. The reasons for determining the appropriate range for the perimeter dividing number to be a range from 7 to 20 are explained later with reference to specific examples.

To calculate the non-circularity of the core portion, it is necessary to obtain data including the values of the outer diameter of the core portion which are measured from different directions at the same perimeter. To obtain such data, in the conventional art, the relative values of the outer diameter of the core portion are measured in such a manner that the optical fiber base material is held and rotated for each of the measurement positions determined in the longitudinal direction. According to the present invention, alternatively, the relative values of the outer diameter of the core portion are serially measured while the optical fiber base material is held at each angle and moved upward or downward. Therefore, the positions at which the relative value of the outer diameter of the core portion is measured may be differently arranged in the longitudinal direction of the optical fiber based material 1 for each of the distributions of the relative values of the outer diameter of the core portion, in the present invention. Also, in reality, the relative values of the outer diameter are discrete values which are sampled at regular intervals. By interpolating and shaping the measured distributions of the relative values of the outer diameter, however, valid relative values of the outer diameter are obtained at a desired interval in the longitudinal direction of the optical fiber base material. Therefore, the moving speed of the optical fiber base material is not limited by the requirements in relation to the alignment accuracy. As a result, the optical fiber base material 1 can be moved at a high speed during the measurement process.

The above-mentioned alignment accuracy is explained in the following. When the distribution of the relative values of the outer diameter is measured in association with each angle with respect to the reference angle, it may be attempted to align the optical fiber base material in terms of the measurement positions determined in the longitudinal direction. In this case, while the measurement position information is monitored, the measured relative value of the outer diameter needs to be received for a predetermined position. To achieve this, a difference between the position at which the measurement is scheduled to be performed and the position at which the measurement is actually performed needs to be sufficiently smaller than the interval at which the measurement is performed in the longitudinal direction. Consequently, it is inevitably necessary to move the optical fiber base material at a low speed.

For example, when the measurement is performed at an interval of 0.2 mm, it is assumed that the acceptable difference between the positions at which the measurement is scheduled to be performed and actually performed is up to one-tenth of the measuring interval and that the rate of receiving the measured value is 20 ms per position. In this case, the requirements relating to the alignment accuracy limit the moving speed so as to be equal to or lower than 0.02 mm/20 ms=1 mm/s. When the measurement is performed for the optical fiber base material 1 having a length of 500 mm with the moving speed being set at 1 mm/s and the perimeter dividing number being set at 10, the measurement process takes eight minutes or longer for each angle and takes 80 minutes or longer for all the angles along the perimeter. Furthermore, the time required to move the base material to start the measurement process for the next angle needs to be considered. The time for this movement is multiplied by a number in accordance with the perimeter dividing number, in this exemplary case, 9, and added. Consequently, it takes an extremely long time to complete the entire measurement process.

In comparison, the above-described method according to the present invention has the following advantage. When the measurement is performed at an interval of 0.2 mm, the data is serially received with the acceptable positional difference being set at approximately half the measuring interval, in other words, without aligning the optical fiber base material 1 in terms of measurement positions in the longitudinal direction. The received data is interpolated and shaped by using a method described later. In this case, the moving speed of the optical fiber base material 1 is (0.2 mm×½)/20 ms=5 mm/s. As a result, the present invention can achieve a five-time higher moving speed when compared with the above case where the alignment is performed. As another example, when the measurement is performed by using the method according to the present invention at an interval of 0.25 mm on the core portion of the optical fiber base material 1 having a length of 800 mm with the perimeter dividing number being set at 7, the non-circularity of the core portion for the entire length can be calculated within slightly shorter than approximately 17 minutes. As a further different example, when the measurement is performed by using the method according to the present invention at an interval of 1 mm on the core portion of the optical fiber base material 1 having a length of 800 mm with the perimeter dividing number being set at 7, the non-circularity for the entire length can be calculated within approximately 12.5 minutes.

When the method disclosed in the previously-described unexamined Japanese Patent Application Publication is used to measure the non-circularity under similar conditions, it is estimated to take 10 hours or longer to obtain the non-circularity for the entire optical fiber base material 1. In reality, it is not acceptable to consume such a long time for the non-circularity measurement in the manufacturing process. Therefore, some compromises are thought to be made in practice, for example, the measurement accuracy is lowered.

Figure 3:
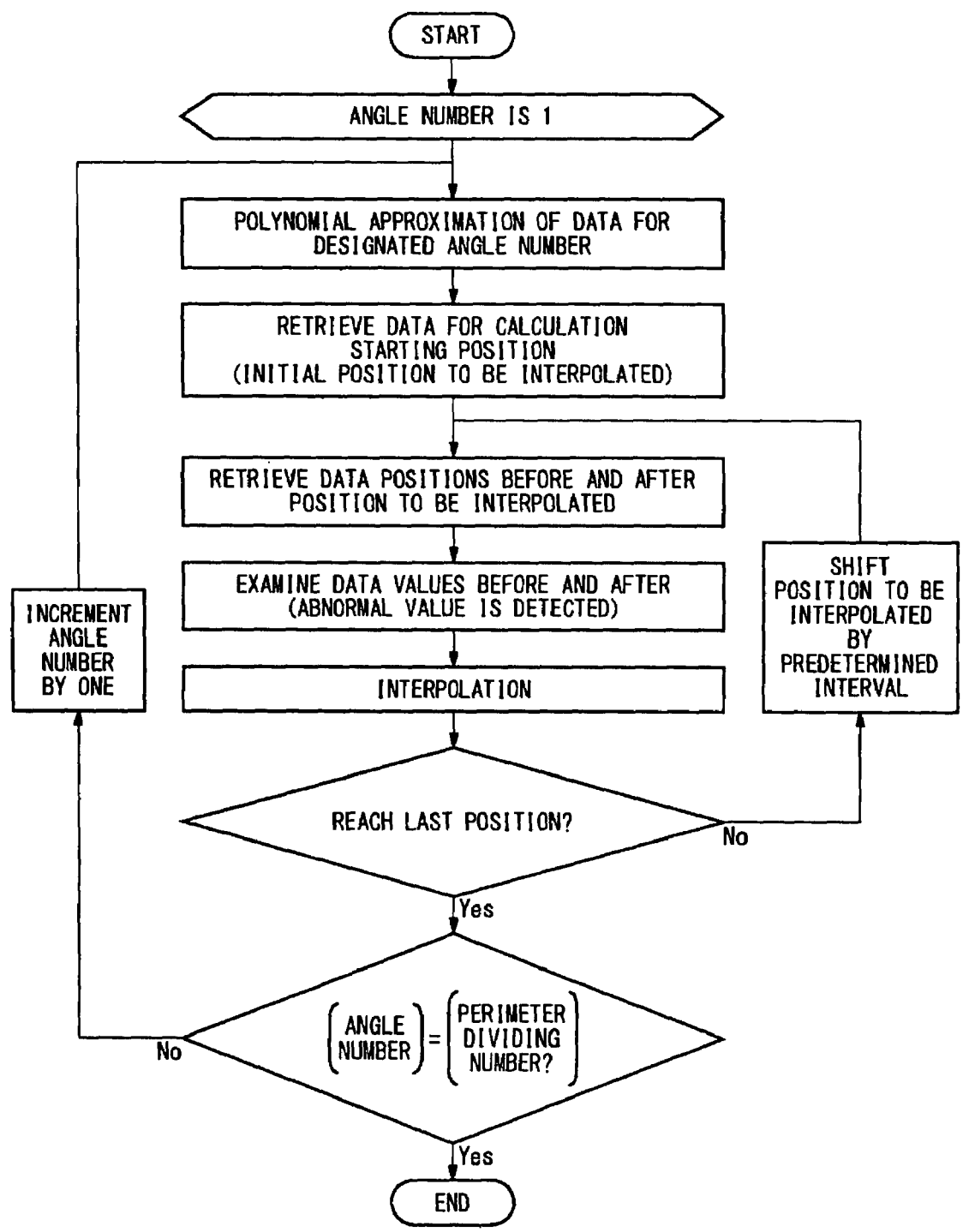
FIG. 3 is a flow chart illustrating a process of interpolating and shaping the data obtained by the measurement.

FIG. 3 is a flow chart illustrating the process of interpolating and shaping the relative values of the outer diameter which is performed prior to the calculation of the non-circularity. The interpolation is performed, in terms of the position in the longitudinal direction, on the measured values included in the distributions of the relative values of the outer diameter. Which is to say, the interpolation converts each distribution of the relative values of the outer diameter that is made up by the discrete measured values into a distribution made up by more continuously arranged values. In this way, the relative values of the outer diameter selected to calculate the non-circularity for a given cross-section all correspond to the same position. Accordingly, the non-circularity of the core portion can be obtained by using a technique such as sin 2θ fitting and Fourier analyses.

Note that, when the optical fiber base material 1 is moved at a high speed, it is difficult to average the value at the measurement position. For this reason, it is difficult to remove an abnormal value of the outer diameter of the core portion (noise) which may be generated due to dust in the matching oil or a flaw on the surface of the optical fiber base material 1. Here, the non-circularity of the core portion is calculated based on how the outer diameter of the core portion varies in a direction along the perimeter at a given position of the optical fiber base material 1. When an abnormal measured value due to a noise is included, the non-circularity is wrongly calculated high for the given position irrespective of the right non-circularity. As a result, even when the optical fiber base material 1 is acceptable, wrong judgment indicating that the optical fiber base material 1 is defective may be made.

It should be noted here that the outer diameter of the core portion of the optical fiber base material 1 varies in a relatively smooth and continuous manner in the longitudinal direction of the optical fiber base material 1. Therefore, it is possible to determine whether a given measured value is abnormal or not by comparing the given measured value with adjacent pieces of data. It is preferable to judge whether an average value among measured values at three measurement positions, which include the given measured value and adjacent pieces of data, falls within a predetermined acceptable range. When the average value exceeds the acceptable range, the given measured value is eliminated as an abnormal value. A preferable method to do this is explained in the following. The values of the outer diameter which are included in the distribution of the relative values of the outer diameter for each angle and are serially measured in the longitudinal direction are approximated by using a polynomial, in such a manner that the position is represented by x and the outer diameter of the core portion is represented by y. Based on the result of the polynomial approximation, it is judged whether the approximated values fall within a predetermined acceptable range. This method can deal with the variation of the outer diameter of the core portion over a long distance. Here, $6^{th}$-order to $10^{th}$-order polynomial approximations are considered appropriate. When a polynomial approximation of a lower-order than $6^{th}$-order is used, the inherent variation of the outer diameter of the core portion is ignored and a normal value tends to be judged as an abnormal value. When a polynomial approximation of a higher-order than $10^{th}$-order, it is more likely to pick up successive abnormal values and an abnormal value tends to be judged as a normal value.

Referring to the measured values of the outer diameter of the core portion, it is necessary to shape the data including the values of the outer diameter of the core portion which are serially measured in the longitudinal direction. This interpolation interpolates data indicating the outer diameter of the core portion at a desired interval in the longitudinal direction, based on pieces of data corresponding to positions, in the longitudinal direction, before and after the position for which calculation of the non-circularity is desired. The data to be interpolated can be calculated by using the following expression, where X represents a desired position, $D_\square$ represents the outer diameter measured at the desired position, $\square_1$ and $D_1$ respectively represent the position preceding the desired position and outer diameter for the preceding position, and $\square\square_2$ and $D_2$ respectively represent the position following the desired position and outer diameter for the following position.

$$D_x = \frac{D_2 - D_1}{x_2 - x_1} \times (X - x_1) + D_1 \quad \text{[Expression 1]}$$

Figure 4:
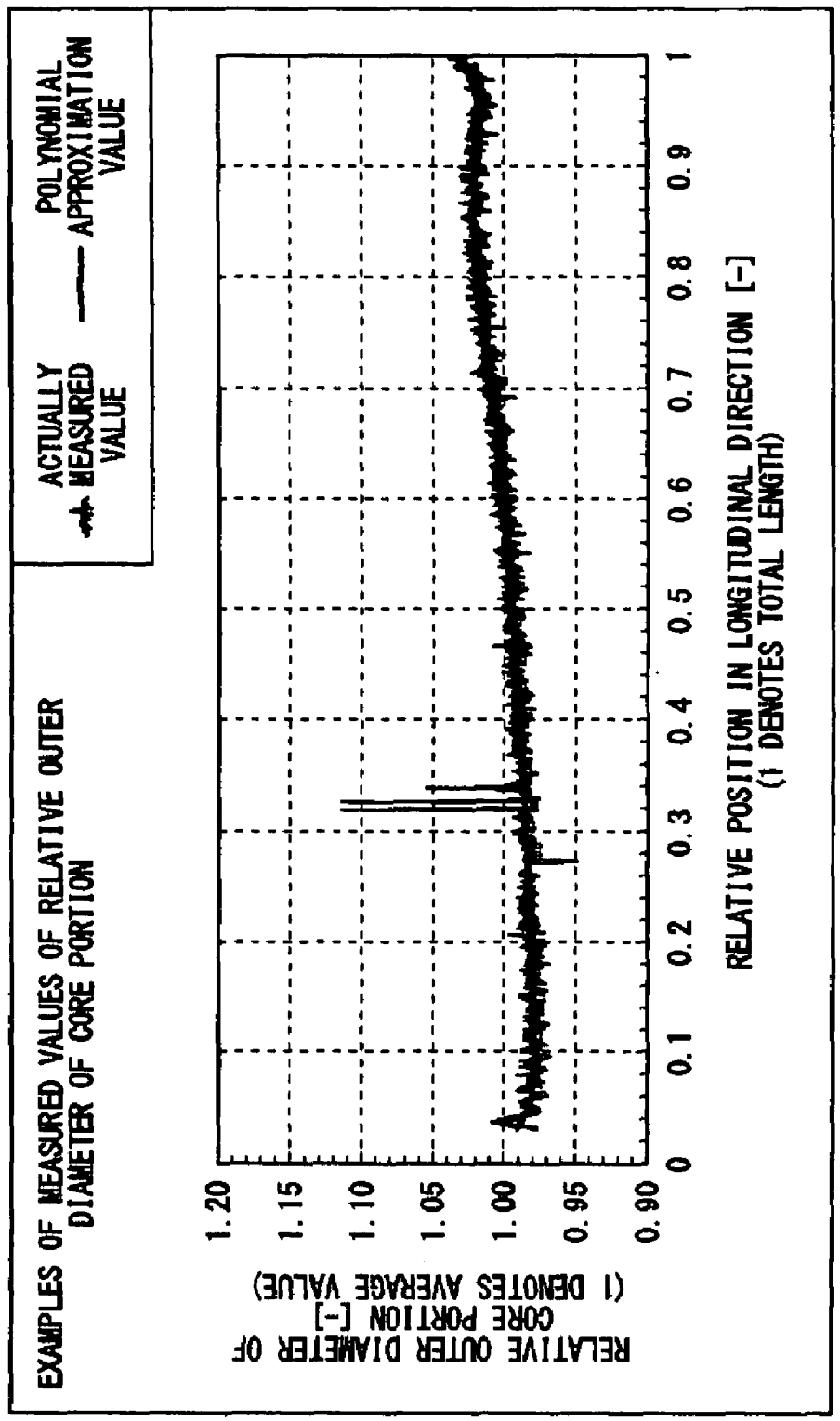
FIG. 4 is a graph illustrating the relative values of the outer diameter of a core portion which are measured at different positions along the longitudinal direction when an optical fiber base material is held at a certain angle (a curve made up by actually measured values) and values obtained by performing a polynomial approximation on the actually measured values (a curve made up by polynomial approximation values).
Figure 5:
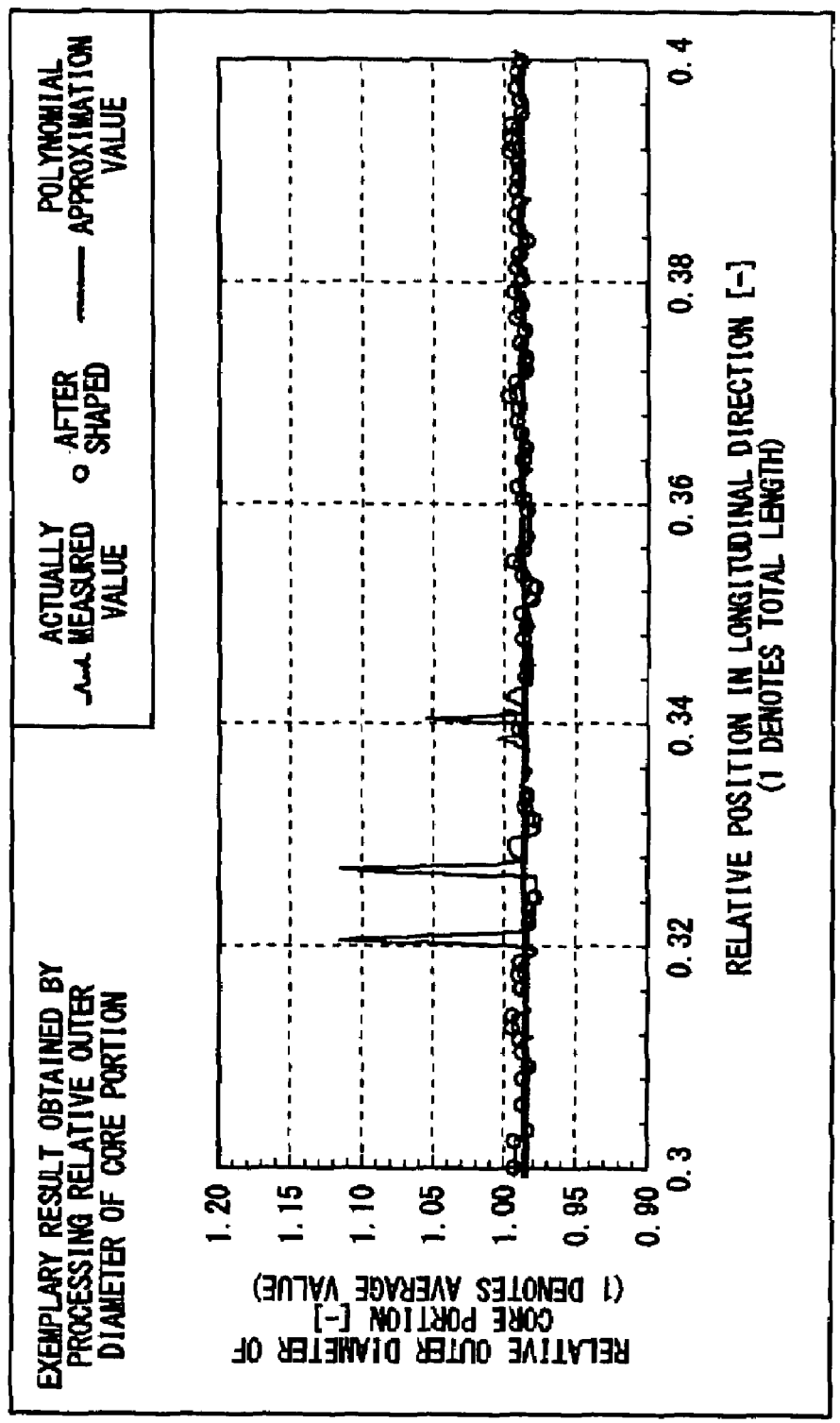
FIG. 5 is a graph illustrating resulting data obtained by interpolating and shaping the data of FIG. 4 which is obtained by the measurement.

The following illustrates, as an example, resulting data obtained by interpolating and shaping the relative values of the outer diameter of the core portion. FIG. 4 is a graph illustrating the relative values of the outer diameter of the core portion which are serially measured in the longitudinal direction while the optical fiber base material is held at a certain angle (before the shaping process is performed, the curve made up by the actually measured values in FIG. 4) and values obtained by performing a polynomial approximation on the actually measured values (the curve made up by polynomial approximation values in FIG. 4). In FIG. 4, a distinctively large variation is found at a position which is located at 200 mm to 300 mm distant from the end in the longitudinal direction. FIG. 5 illustrates the result of interpolating and shaping the actually measured values, after the actually measured values are approximated by using an eighth-order polynomial and abnormal values are eliminated with the acceptable range being set at ±0.25 mm. The values which are found at the positions of 200 mm to 300 mm and show large variations are eliminated as abnormal values, and the remaining values are interpolated and shaped so as to be arranged at an interval of 1 mm.

As described before, the perimeter dividing number preferably falls within the range from 7 to 20. This appropriate range is determined by setting the perimeter dividing number at different values, calculating the ellipticity of the core portion by means of Fourier analyses for each value of the perimeter dividing number, and examining whether the calculated ellipticity is stable. This process of determining the appropriate range is described in the following.

Figure 6:
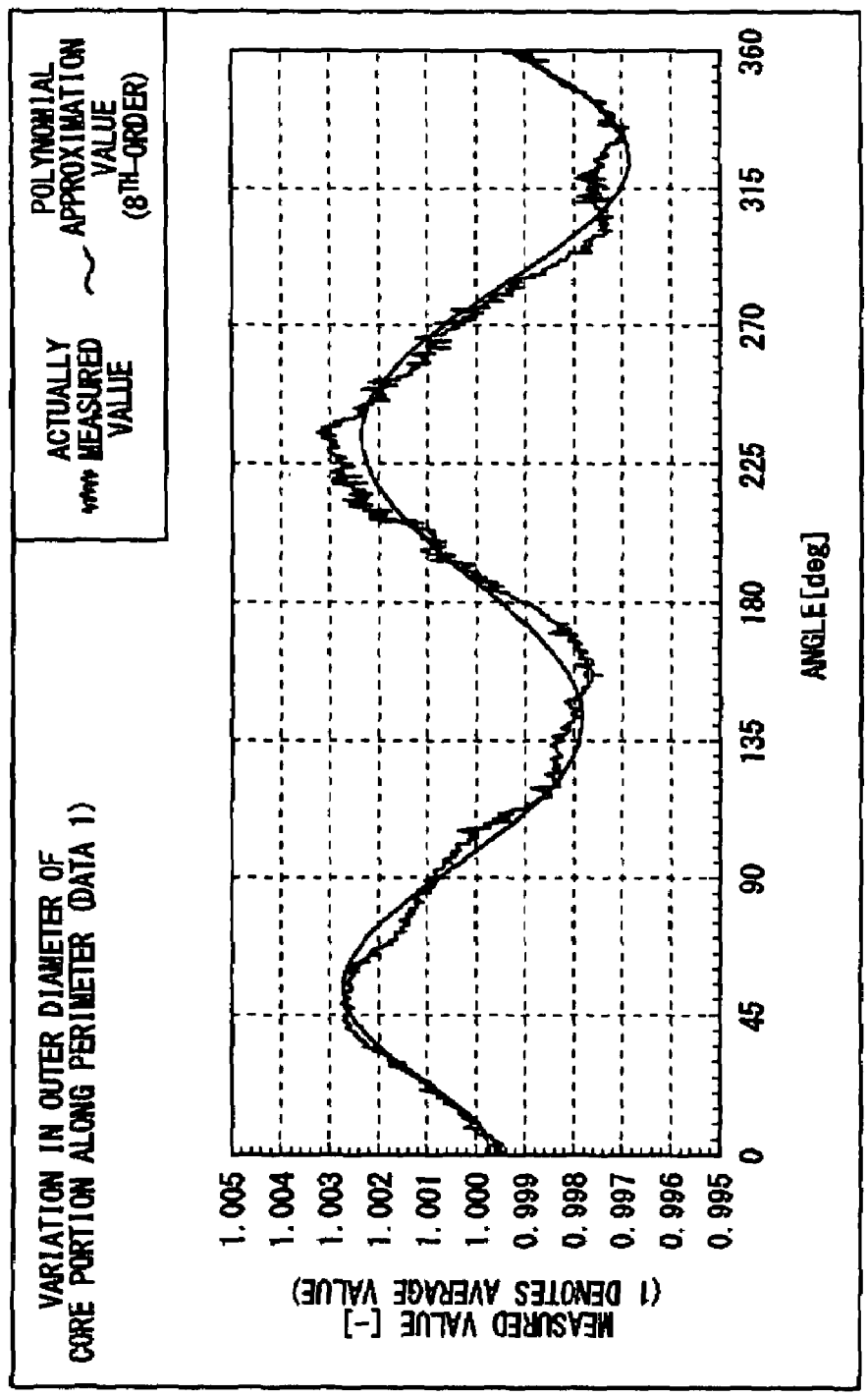
FIG. 6 is a graph illustrating, as an example, the values of the outer diameter of the core portion in association with the angle along the perimeter for 360 degrees (data 1).
Figure 7:
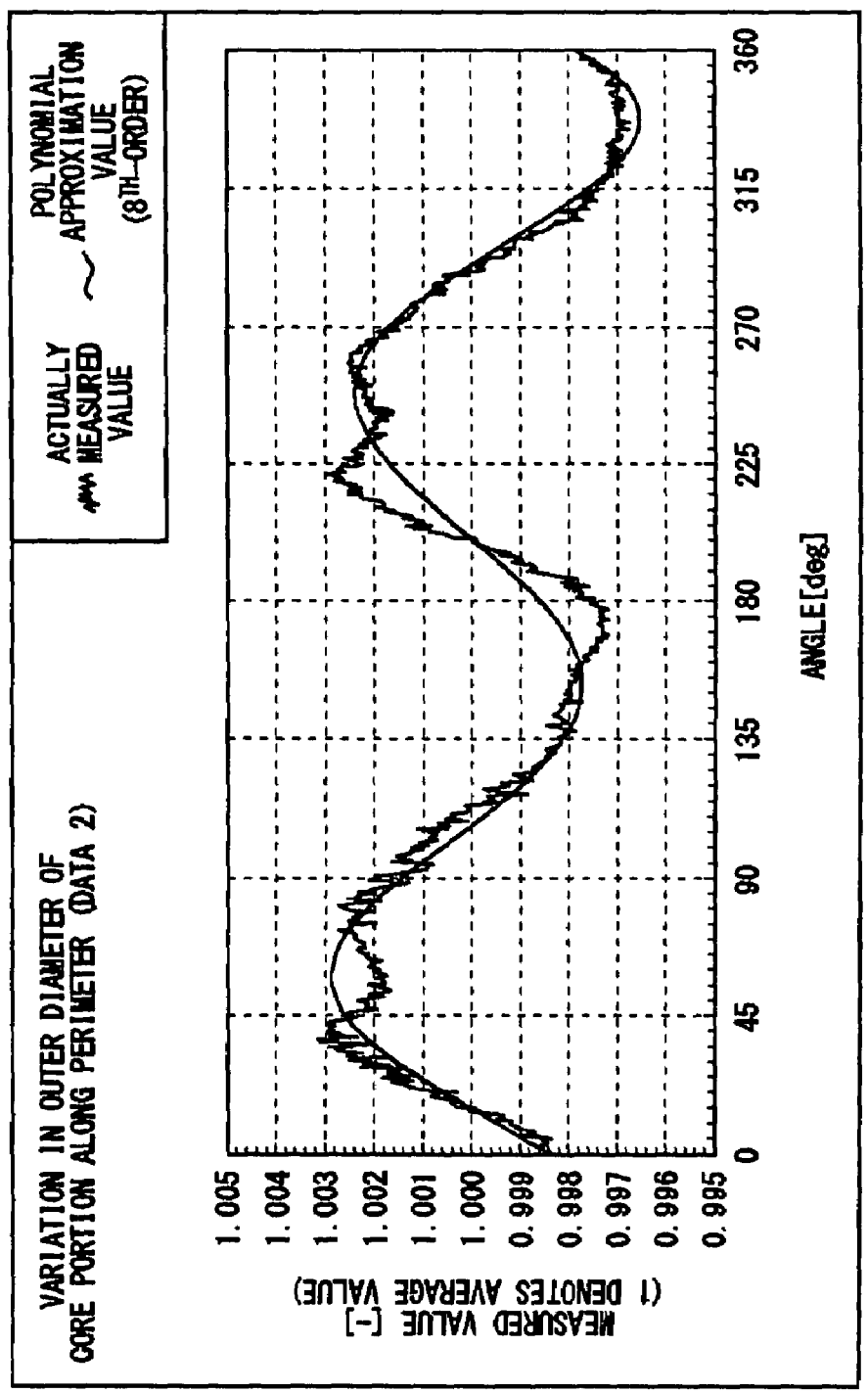
FIG. 7 is a graph illustrating, as an example, the values of the outer diameter of the core portion in association with the angle along the perimeter for 360 degrees (data 2).

FIG. 6 shows, as an example, measured values of the outer diameter of the core portion for a given position in the longitudinal direction in association with the angle along the perimeter for 360° (data 1). FIG. 7 shows, as an example, measured values of the outer diameter of the core portion for a given position in the longitudinal direction in association with the angle along the perimeter for 360°. Since some of the values making up the data 1 and data 2 are influenced by noise, an eighth-order polynomial approximation is performed on the data 1 and data 2 and the values obtained as a result of the polynomial approximation are also shown in FIGS. 6 and 7 as polynomial approximation data.

Figure 8:
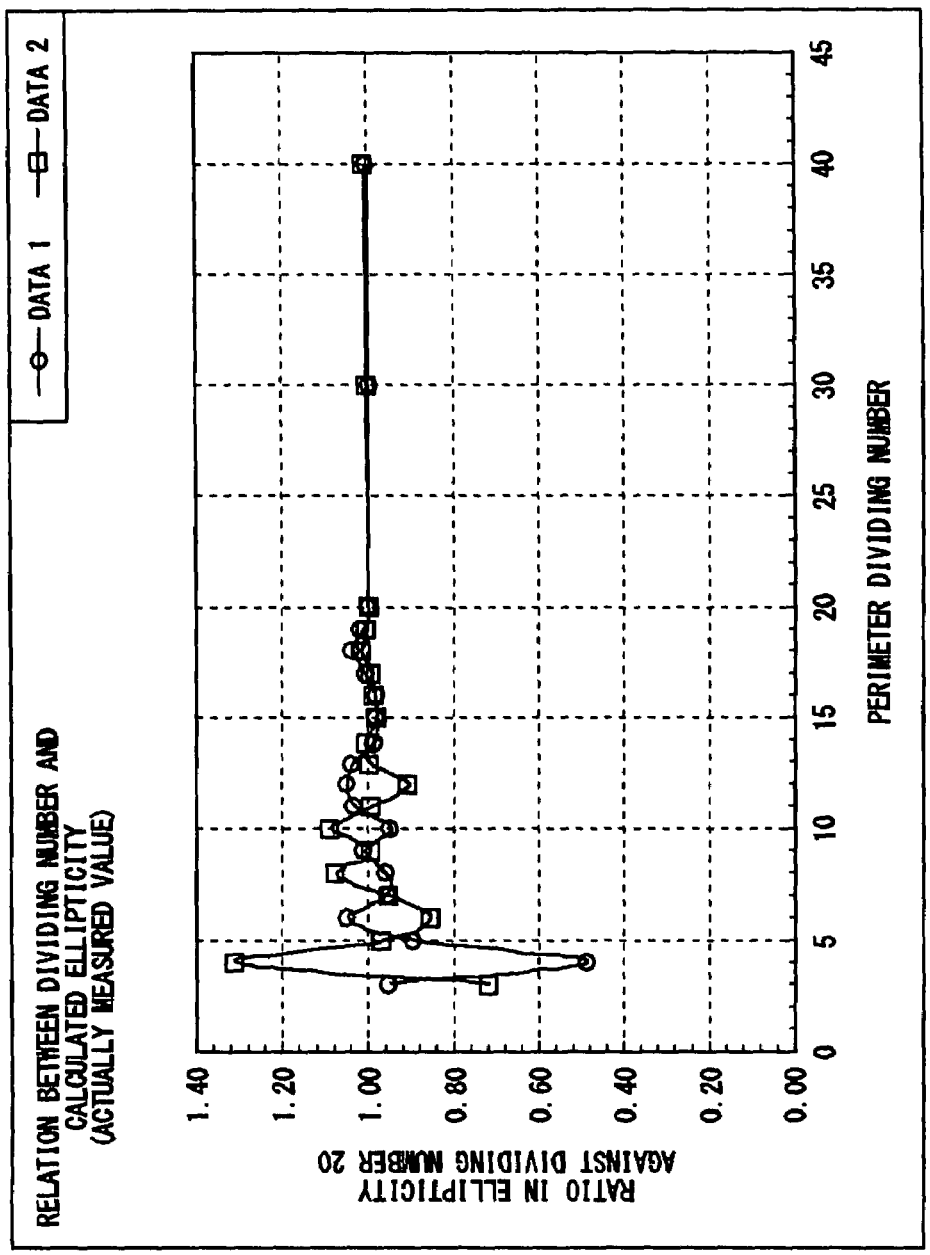
FIG. 8 is a graph illustrating the relation, which is obtained when the actually measured values are used, between the perimeter dividing number and the ratio, in terms of the ellipticity of the core portion, against the perimeter dividing number of 20.
Figure 9:
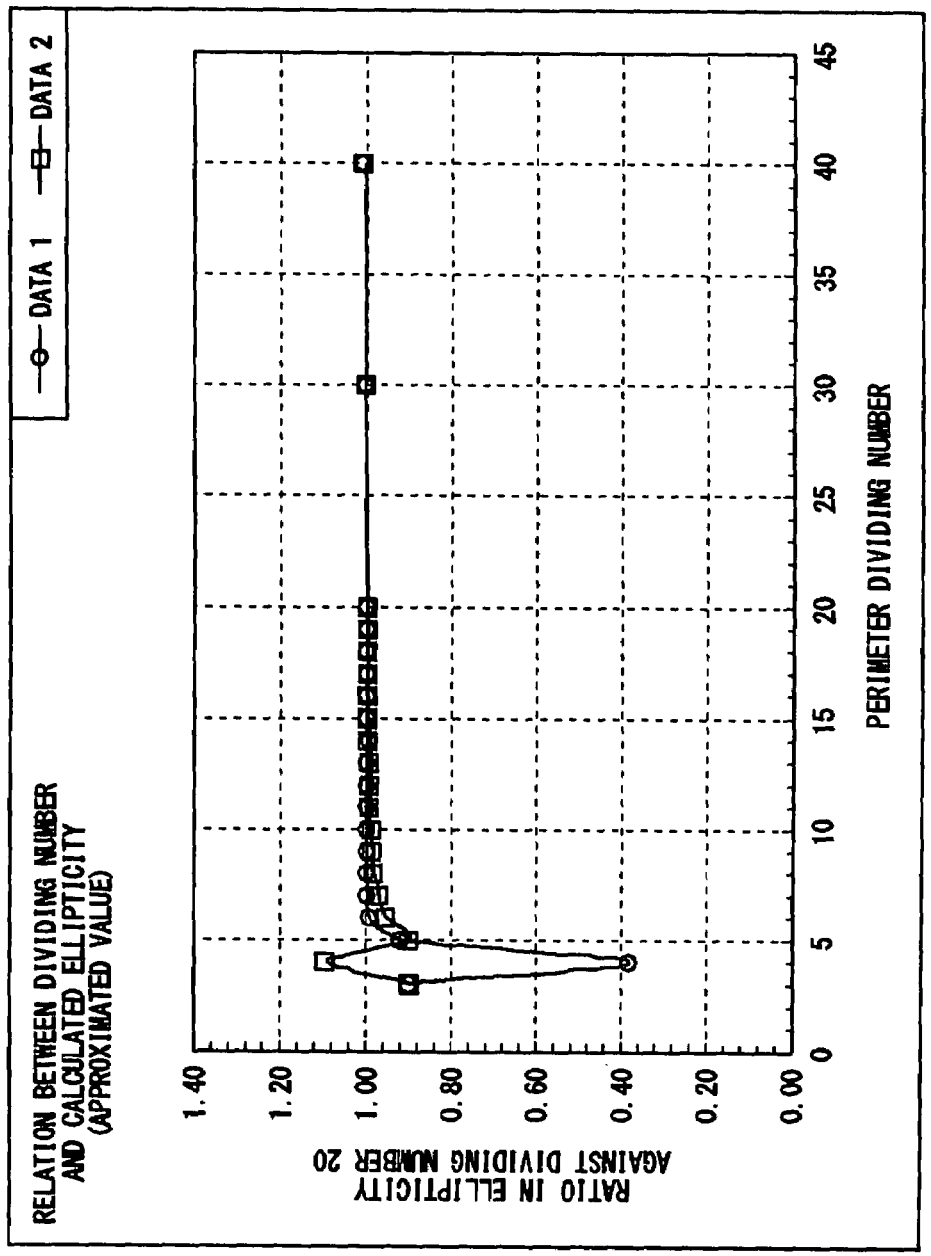
FIG. 9 is a graph illustrating the relation, which is obtained when the approximated values are used, between the perimeter dividing number and the ratio, in terms of the ellipticity of the core portion, against the perimeter dividing number of 20.

With the use of the data 1 and data 2, the ratio in terms of the ellipticity of the core portion is calculated between when the perimeter dividing number is set at a given value and when the perimeter dividing number is set at 20, where the given value is varied in a range from 3 to 40. When the actually measured values are used without a change, a relation shown in FIG. 8 is found between the perimeter dividing number and the ratio in terms of the ellipticity of the core portion against the perimeter dividing number of 20. When the values obtained by the approximation are used, a relation shown in FIG. 9 is found between the perimeter dividing number and the ratio in terms of the ellipticity of the core portion against the perimeter dividing number of 20.

In both of the cases where the data 1 and data 2 are used, the ratio in terms of the ellipticity of the core portion against the perimeter dividing number of 20 hardly varies when the perimeter dividing number is set at 20 or higher. These results indicate that the optimal value of the perimeter dividing number is 20 for accurate measurement and that the perimeter dividing number higher than 20 does not change the result of the calculation of the ellipticity of the core portion. When an error rate of less than 10% which may be caused by noise is accepted, the perimeter dividing number may be set at any value in a range from 7 to 20. When the perimeter dividing number is reduced, an odd number is more desirable. As discussed above, the perimeter dividing number may be appropriately selected among values in a range from 7 to 20 while the time required for the measurement process and accuracy are balanced therebetween.

While one aspect of the present invention has been described through an embodiment, the technical scope of the invention is not limited to the above described embodiment. It is apparent to persons skilled in the art that various alternations and improvements can be added to the above-described embodiment It is also apparent from the scope of the claims that the embodiments added with such alterations or improvements can be included in the technical scope of the invention.

As is apparent from the above description, an embodiment of the present invention makes it possible to complete, within a short time, the measurement of the non-circularity of the core portion of the optical fiber base material for the control of the PMD which plays a critical role in long-distance and high-speed communication.

What is claimed is:

1. A method for measuring non-circularity of a core portion of an optical fiber base material, comprising:
    a distribution measuring step of (i) moving the optical fiber base material in a direction parallel to a central axis of the core portion while light is irradiated, in a direction perpendicular to the central axis, to the optical fiber base material which is immersed in an oil, and (ii) measuring a variation in a width of a portion of the irradiated light which transmits through the core portion, for a predetermined length of the optical fiber base material in a serial manner in a longitudinal direction of the optical fiber base material and recording the variation in a width of a portion of the irradiated light in association with a moved distance of the optical fiber base material, thereby measuring a distribution of relative values of an outer diameter of the core portion in terms of the longitudinal direction of the optical fiber base material;
    a distribution storing step of performing the distribution measuring step each time the optical fiber base material is rotated about the central axis by a predetermined angle, thereby recording a plurality of distributions of the relative values of the outer diameter of the core portion each of which is associated with the predetermined angle; and a non-circularity calculating step of calculating a plurality of values, in terms of the longitudinal direction of the optical fiber base material, each indicating non-circularity of the core portion, based on the plurality of distributions of the relative values of the outer diameter stored in the distribution storing step.

2. The method as set forth in claim 1, wherein the predetermined angle is equal to a result of dividing an angle corresponding to one rotation of the optical fiber base material about the central axis by a number selected from 7 to 20.

3. The method as set forth in claim 1, wherein the plurality of values each indicating the non-circularity of the core portion are calculated after approximated values are calculated for each of the plurality of distributions by means of a polynomial approximation and a measured value is eliminated as an abnormal value when the measured value is remarkably deviated from an acceptable range that is determined in advance with respect to the approximated values.

4. The method as set forth in claim 3, wherein the approximated values are calculated by means of one of sixth-order to tenth-order polynomial approximations.

5. The method as set forth in claim 1, wherein each of the plurality of distributions of the relative values of the outer diameter of the core portion is generated by interpolating, based an each pair of adjacent relative values of the outer diameter of the core portion, a plurality of relative values of the outer diameter of the core portion which are measured at a predetermined interval in the direction parallel to the central axis.

6. The method as set forth in claim 5, wherein the plurality of values each indicating the non-circularity are calculated by using $\sin 2\theta$ fitting.

7. The method as set forth in claim 5, wherein the plurality of values each indicating the non-circularity are calculated by using a Fourier analysis.

8. The method as set forth in claim 1, wherein when the optical fiber base material is immersed in the oil, the optical fiber base material is immersed in an index matching oil.

9. The method as set forth in claim 1, wherein the predetermined angle is equal to a result of dividing an angle corresponding to one rotation of the optical fiber base material about the central axis by an odd number.

10. The method as set forth in claim 1, wherein moving the optical fiber base material in the direction parallel to the central axis of the core portion comprises moving the optical fiber base material in a vertical direction within a vessel including an open end.

* * * * *